(12) United States Patent
Jia

(10) Patent No.: US 8,932,486 B2
(45) Date of Patent: Jan. 13, 2015

(54) PERSISTENT PHOSPHORS OF ALKALINE EARTHS MODIFIED BY HALIDES AND 3D IONS

(75) Inventor: Weiyi Jia, Chelmsford, MA (US)

(73) Assignee: Performance Indicator, LLC, Lowell, MA (US)

( * ) Notice: Subject to any disclaimer, the term of this patent is extended or adjusted under 35 U.S.C. 154(b) by 768 days.

(21) Appl. No.: 13/081,536

(22) Filed: Apr. 7, 2011

(65) Prior Publication Data

US 2012/0256126 A1 Oct. 11, 2012

(51) Int. Cl.
C09K 11/08 (2006.01)
C09K 11/61 (2006.01)
C09K 11/77 (2006.01)

(52) U.S. Cl.
CPC .................................. C09K 11/7774 (2013.01)
USPC ............................. 252/301.4 H; 252/301.4 F

(58) Field of Classification Search
USPC .................. 252/301.4 H, 301.4 F; 250/486.1, 250/370.12, 390.11; 428/34.1
See application file for complete search history.

(56) References Cited

U.S. PATENT DOCUMENTS

| | | | |
|---|---|---|---|
| 6,093,946 A | 7/2000 | Li et al. | |
| 7,344,895 B2 | 3/2008 | Kohler et al. | |
| 7,410,810 B2 | 8/2008 | Bohmann et al. | |
| 7,618,556 B2 | 11/2009 | Shunichi et al. | |
| 7,955,524 B2 | 6/2011 | Zhuang et al. | |
| 8,003,012 B2 | 8/2011 | Comanzo et al. | |
| 8,207,661 B2 | 6/2012 | Liu et al. | |
| 8,709,383 B2 | 4/2014 | Scherman et al. | |
| 2004/0014060 A1 | 1/2004 | Hoheisel et al. | |
| 2006/0175956 A1 | 8/2006 | Lai | |
| 2006/0279196 A1 | 12/2006 | Hsu | |
| 2007/0247051 A1* | 10/2007 | Kuze et al. | 313/483 |
| 2007/0295116 A1* | 12/2007 | Le Mercier et al. | 73/866 |
| 2008/0031797 A1* | 2/2008 | Xia et al. | 423/263 |
| 2011/0140042 A1* | 6/2011 | Xu et al. | 252/301.4 R |
| 2012/0056126 A1 | 3/2012 | Miyashita et al. | |

FOREIGN PATENT DOCUMENTS

| | | |
|---|---|---|
| CN | 101064236 A | 10/2007 |
| CN | 101144013 A | 3/2008 |
| CN | 101723588 A | 6/2010 |
| JP | 2004323656 A | 11/2004 |
| JP | 2006332134 A | 12/2006 |

OTHER PUBLICATIONS

EIC Search report (received Sep. 20, 2013).*

(Continued)

*Primary Examiner* — Carol M Koslow
*Assistant Examiner* — Lynne Edmondson
(74) *Attorney, Agent, or Firm* — Cantor Colburn LLP

(57) ABSTRACT

Phosphorescent compositions including silicate of alkaline earth materials which are modified by at least one halide are provided. The phosphorescent compositions may include 3d ions. A variety of embodiments may be realized. The appearance of some embodiments may be glassy (i.e., vitreous).

7 Claims, 6 Drawing Sheets

(56) References Cited

OTHER PUBLICATIONS

Lecointre, et al. "Red long-lasting luminescence in clinoenstatite" Journal of Luminescence (2009), 129(12), pp. 1527-1530—abstract only, 1 Page.

Li, et al. "Spectral Characteristics of Ln (Ln=Gd3+, Cu+, Sm3+, Dy3+) Co-activated Ca8Mg (Si)4) 4C12:Eu2+phospors", Cailiao Daobao, (2011), pp. 51-53—English abstract only, 1 page.

* cited by examiner

PERSISTENT PHOSPHORS OF ALKALINE EARTHS MODIFIED BY HALIDES AND 3D IONS

BACKGROUND OF THE INVENTION

1. Field of the Invention

This invention relates to inorganic luminescent compositions, and more particularly, to compositions including silicate of alkaline earth materials which are modified by at least one halide.

2. Description of the Related Art

Phosphorescent materials are widely known, and applied for a variety of purposes. Many of these purposes are consumer oriented, others are industrial in nature. Given the diversity of applications, there is an ongoing desire for improved phosphorescent materials.

Phosphors, as discussed herein, include materials that exhibit luminescence. Such materials emit light when excited with external pumping light. The emission originates from a small amount of activators incorporated within the crystal lattice. This small fraction is referred to as "emission centers," "luminescence centers," and by other similar terms. Phosphors are usually made from a suitable host material with an added activator, and are formed into the crystal structure. Such activators in the crystal structure are usually introduced in trace amounts, and give rise to the emission.

The crystal structure of a material or the arrangement of atoms within a given type of crystal structure can be described in terms of its unit cell. In simple terms, the unit cell is a small box containing one or more atoms in a spatial arrangement with certain symmetry. When stacked in a three-dimensional space, the unit cells describe the bulk arrangement of atoms of the crystal. The unit cell is given by its lattice parameters which are the length of the cell edges and the angles between them, while the positions of the atoms inside the unit cell are described by a set of atomic positions measured from a lattice point. A variety of lattice systems are known, and include, for example, triclinic, monoclinic, orthorhombic, rhombohedral, tetragonal, hexagonal, and cubic systems. Many of these crystal structures have variations as well.

Each of the atoms bound in the crystal has certain electronic properties (i.e., energy levels or shells in which its respective electrons may reside). The electron shells are labeled K, L, M, N, O, P, and Q; or 1, 2, 3, 4, 5, 6, and 7; going from the innermost shell outwards. Electrons in outer shells have higher average energy and travel farther from the nucleus than those in inner shells. This makes them more important in determining how the atom reacts both chemically and physically and behaves as a conductor, among other things. Each shell is composed of one or more subshells, which are themselves composed of atomic orbitals. For example, the first (K) shell has one subshell, called "1s"; the second (L) shell has two subshells, called "2s" and "2p"; the third shell has "3s", "3p", and "3d"; and so on. Each of the electron shells are filled according to certain theoretical constraints. For example, each s subshell holds at most two electrons; each p subshell holds at most six electrons; each d subshell holds at most ten electrons, and so on.

Once the atoms are bound in the crystalline structure, electrons may be shared between the atoms. The crystalline structure provides for additional and unique electronic properties as a result of the particular chemical bonds and defects formed therein. Accordingly, for each unique phosphor, the specific composition and structure of the phosphor provides unique combinations of energy levels from which electrons may decay, and therefore emit photons.

The host materials are often one of an oxide, nitride, oxynitride, sulfide, selenide, halide, and may include calcium, strontium, aluminium, silicon, or various rare earth metals. Among other things, the activators may prolong the emission time (afterglow) of the phosphor once it has been excited by a light source.

Fabrication of a phosphor generally involves a multi-step process. In this process, bulk material (which includes the host material, as well as the activator, and may contain other materials, such as a co-activator and flux) is milled to a desired particle size. The mixture is then fired for some period of time at temperatures ranging from about 900 degrees Celsius to about 1,500 degrees Celsius or more. Most often, the firing involves environmental controls, such as the use of a desired gas, or mixture of gases. The process may be repeated if desired. Although firing of the mixture is used to form well crystallized particles, a flux compound may be added to assist this formation. Generally, the addition of flux reduces the energy required for crystal growth.

Although some materials may be beneficial for achieving desired properties in the formation of a phosphor, there is a risk that incorporation of excessive quantities or improper forms of materials will ultimately quench output of the finished product.

The commonly quoted parameters assessing performance of a phosphor include the wavelength of emission maximum (in nanometers, or alternatively color temperature in degrees kelvin, such as for white blends), the peak width (in nanometers, usually at fifty percent of intensity, or full-width, half-maximum (FWHM)), and decay time (in seconds).

Accordingly, improvement to phosphors requires careful consideration of many aspects of crystal structures as well as thoughtful fabrication techniques.

Given the continuing need for phosphorescent materials that meet demanding standards of use, there are many opportunities to provide improved phosphor materials. Preferably, the phosphorescent materials perform well optically (such as by exhibiting high intensity of emissions as well as by exhibiting persistent emissions). It is also preferred that the phosphorescent materials exhibit emissions in wavelengths (or bands of wavelengths) that have not been previously exhibited, or exhibited by optically robust materials.

BRIEF SUMMARY OF THE INVENTION

In one embodiment, the invention includes a phosphorescent silicate-halide composition, according to the general formula: $(n-x)MO \cdot xM'X_2 \cdot (1-k)MgO \cdot kMgX_2 \cdot 2SiO_2:yEu, zR, wD$ where M is at least one of Sr, Ca, and Ba; M' is at least one of Sr, Ca and Ba; X is at least one of F and Cl; R is at least one of $Dy^{3+}$, $Nd^{3+}$, and optionally comprises at least one rare earth selected from the group of ions comprising La, Ce, Pr, Sm, Gd, Tb, Ho, Er, Tm, Yb, Y and Lu; D is at least one 3d ion selected from the group comprising Ti, V, Cr, Mn, Fe, Co, Ni, Cu; n ranges from 0.9 to 3.2; x ranges from 0.0001 to 0.7; k ranges from 0.0001 to 1.0; y ranges from 0.0001 to 0.1; z ranges from 0.0001 to 0.1; and w ranges from 0.0001 to 0.02. In another embodiment, R = at least one of $Dy^{3+}$, $Nd^{3+}$, and optionally further comprises one or more other rare earth elements.

In another embodiment, the invention includes a phosphorescent silicate-halide composition, according to the general formula: $(n-x)MO \cdot xM'X_2 \cdot (1-k)MgO \cdot kMgX_2 \cdot 2SiO_2:yEu, zR, wD$ where n=2; M=Sr; M'=Ba; X=F and Cl; R=$Dy^{3+}$, $Nd^{3+}$, $Er^{3+}$, $Tm^{3+}$, $Ho^{3+}$, or a combination thereof; D is at least one 3d ion selected from the group consisting of Ti, V, Cr, Mn, Fe, Co, Ni and Cu; x=0.0001 to 0.7; k=0; y=0.0001 to 0.1; z=0.0001 to 0.1; and w=0.001 to 0.02.

In another embodiment, the invention includes a method for fabricating a glassy phosphorescent silicate-halide composition, the method including: mixing a composition according to the general formula: $(n-x)MO \cdot xM'X_2 \cdot (1-k)MgO \cdot kMgX_2 \cdot 2SiO_2$:yEu,zR,wD where M is at least one of Sr, Ca, and Ba; M' is at least one of Sr, Ca and Ba; X is at least one of F and Cl; R is at least one of $Dy^{3+}$, $Nd^{3+}$, and optionally comprises at least one rare earth selected from the group of ions comprising La, Ce, Pr, Sm, Gd, Tb, Ho, Er, Tm, Y, Yb, and Lu; D is at least one 3d ion selected from the group comprising Ti, V, Cr, Mn, Fe, Co, Ni, Cu; n ranges from 0.9 to 3.2; x ranges from 0.0001 to 0.7; k ranges from 0.0001 to 1.0; y ranges from 0.0001 to 0.1; z ranges from 0.0001 to 0.1; w ranges from 0.0001 to 0.02; sintering the mixture at a temperature from about 850 degrees Celsius to about 1,400 degrees Celsius; and finishing the composition at a temperature that is elevated about 50 degrees Celsius to about 100 degrees Celsius above the sintering temperature.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Disclosed herein are phosphors of silicate of alkaline earths which are modified by halides. Embodiments disclosed herein include certain advantages, such as exhibiting a high persistence emission (i.e., a long afterglow). The phosphors make use of alkaline earth fluorides and chlorides to stimulate crystallization through effecting fluxing properties during fabrication, thus resulting in an improved brightness of phosphorescent emission. Additionally, alkaline earth fluorides and chlorides are used to greatly reduce synthesis temperature, thus providing for more economic fabrication. Further, the alkaline earth fluorides and chlorides may be used to make glassy phosphors, which are useful in a variety of applications. Notably, emission color of phosphors using the alkaline earth fluorides and chlorides may be tuned by incorporation of, for example, $BaF_2$ (to the deep blue) and $CaF_2$ (to the green side).

Embodiments of phosphors disclosed herein include variations of the blue phosphor $Sr_2MgSi_2O_7$:Eu,Dy. This "base phosphor" was modified by incorporating alkaline earth fluorides or chlorides into the phosphor lattice as is described further herein.

In various embodiments produced, it was found that, among other things, fluorides and chlorides of alkaline earths, Mg, Ca, Sr and Ba, can be readily incorporated into the lattice of the blue phosphor $Sr_2MgSi_2O_7$:Eu,Dy. The crystal structure was found to remain virtually unchanged.

Figure 1:
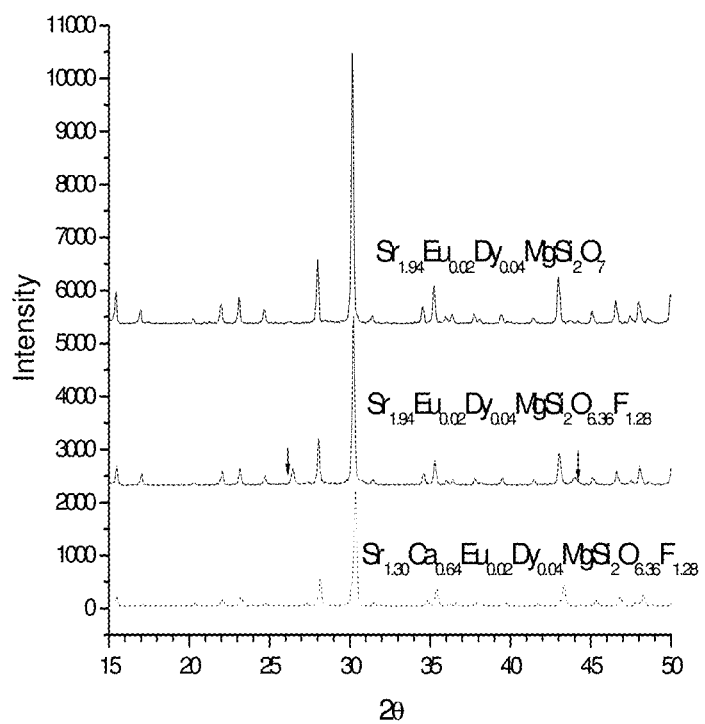
FIG. 1 is a graph showing X-ray diffraction patterns of $Sr_{1.94}Eu_{0.02}Dy_{0.04}MgSi_2O_7$, $Sr_{1.94}Eu_{0.02}Dy_{0.04}MgSi_2O_{6.36}F_{1.28}$ and $Sr_{1.30}Ca_{0.64}Eu_{0.02}Dy_{0.04}MgSi_2O_{6.36}F_{1.28}$. No $SrF_2$ and $CaF_2$ phases were detected in these phosphors.
Figure 2:
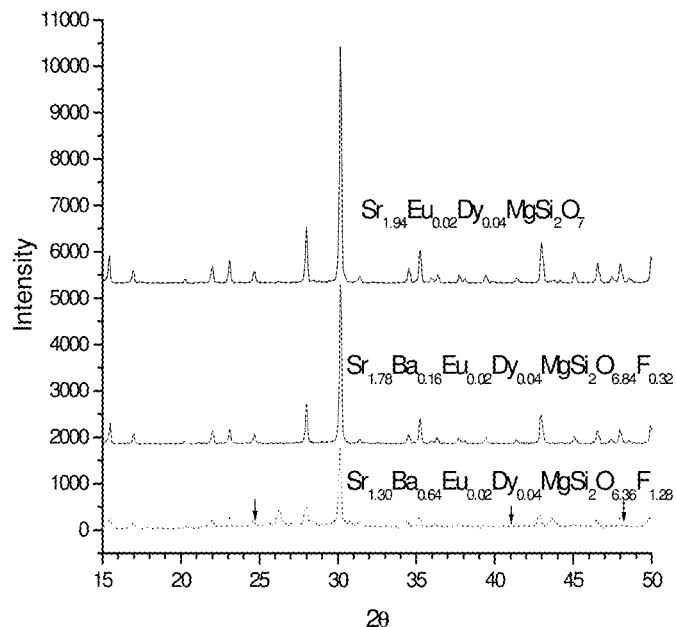
FIG. 2 is a graph showing X-ray diffraction patterns of $Sr_{1.94}Eu_{0.02}Dy_{0.04}MgSi_2O_7$, $Sr_{1.78}Ba_{0.16}Eu_{0.02}Dy_{0.04}MgSi_2O_{6.84}F_{0.32}$ and $Sr_{1.30}Ba_{0.64}Eu_{0.02}Dy_{0.04}MgSi_2O_{6.36}F_{1.28}$. No $BaF_2$ phase was detected in the phosphor.

Referring to the drawings, FIG. 1 shows the X-ray diffraction patterns of $Sr_2MgSi_2O_7$:0.02Eu,0.04Dy, without and with incorporation of $0.64SrF_2$ and $0.64CaF_2$. Note that arrows in FIG. 1 indicate the x-ray peak positions for $SrF_2$ and $CaF_2$ phases. FIG. 2 shows X-ray diffraction patterns of $Sr_2MgSi_2O_7$:EuDy with incorporation of 0.16 and $0.64BaF_2$. Note that arrows in FIG. 2 indicate the x-ray peak position for the $BaF_2$ phase. From these figures, it can be seen that the crystal structure of these phosphors remains virtually unchanged. No extra peaks from $SrF_2$ phase, $CaF_2$ or $BaF_2$ phases are seen in the patterns.

In development of these embodiments, it was further found that fluorides and chlorides of the alkaline earth elements could be used to stimulate the crystallinity of the phosphors. As a result, the phosphorescence and afterglow were likewise improved by the incorporation of certain amounts of fluorides or chlorides of alkaline earth elements.

Further, it was found that incorporation of fluorides may be used to tune the emission color of the phosphors. For example, by partial replacement of SrO in the base phosphor by $0.64SrF_2$, $0.64BaF_2$ and $0.64CaF_2$ the emission wavelength can be changed from 470 nm to 468 nm, 455 nm and 490 nm, respectively. By incorporation of $BaF_2$ or its combination with BaO, a deep blue phosphor with emission at around 460 nm can be obtained.

It was also found that fluorides $BaF_2$, $MgF_2$, $CaF_2$ and $SrF_2$ may reduce the synthesis temperature of the phosphors. This may save a lot of energy in synthesis of the phosphors. For example, $Sr_{0.94}BaEu_{0.02}Dy_{0.04}MgSi_2O_6F_2$ (with $1.0BaF_2$) can be synthesized at a temperature as low as 850 degrees Celsius, $Sr_{1.44}Ba_{0.5}Eu_{0.02}Dy_{0.04}MgSi_2O_{6.5}F$ (with $0.05BaF_2$), $Sr_{1.94}Eu_{0.02Eu}Dy_{0.04}MgSi_2O_{6.5}F$ (with $0.50MgF_2$) and $Sr_{0.94}Ca_{0.5}Eu_{0.02}Dy_{0.04}MgSi_2O_{6.5}F$ (with $0.05CaF_2$) can be synthesized at 950 degrees Celsius, while $Sr_{1.94}Eu_{0.02}Dy_{0.04}MgSi_2O_6F_2$ (with $1.0SrF_2$) and $Sr_{1.94}Eu_{0.02}Dy_{0.04}MgSi_2O_6F_2$ (with $1.0MgF_2$) can be synthesized at 1000 degrees Celsius.

In addition, with a lower melting temperature, it becomes possible to make glassy blue phosphors. Such glassy phosphors can be used as gems or other decoration materials.

It was found that the body color of the blue phosphors may be modified by use of 3d ions as new trapping centers. Examples include ions such as $Co^{2+}$, $Fe^{2+}$, $Cr^{3+}$, $Mn^{2+}$, $Ni^{2+}$. As example of modifying the body color, co-doping with $Co^{2+}$ will give blue body color to the phosphors, which provides a close match to the emission color.

Examples of phosphors fabricated according to the teachings herein are now discussed.

Example 1

In a first example, the base phosphor $Sr_2MgSi_2O_7$:EuDy was used with incorporation of $MF_2$. More specifically, and as described by the chemical formulae $Sr_{1.94-x}Eu_{0.02}Dy_{0.04}MgSi_2O_{6.96}$:$xMF_2$ with M=Sr,Ca and Ba, according to the following recipe:

(1.94−x) $SrCO_3$+$xMF_2$+MgO+$2SiO_2$+0.01$Eu_2O_3$+ 0.02$Dy_2O_3$+0.04$H_3BO_3$

With M=Sr,Ca and Ba and x=0, 0.04, 0.08, 0.16, 0.32, 0.64. For $MgF_2$, the following recipe was used:

1.94 $SrCO_3$+(1−k)MgO+$kMgF_2$+$2SiO_2$+0.01$Eu_2O_3$+ 0.02$Dy_2O_3$+0.04$H_3BO_3$ where k=0, 0.04, 0.08, 0.16 or 0.64.

Generally, all of the chemicals used for fabrication have purity levels that exceeded ninety nine percent. Boric acid (which can be replaced by $B_2O_3$) was used as a flux. The chemicals were weighed according to the recipes, then mixed, ground and loaded into alumina combustion boats, pre-sintered (may not be necessary if the mixture is uniform enough) at about 900 degrees Celsius in air for about four hours, and then ground again. The samples were finally sintered at about 900 degrees Celsius to about 1,250 degrees Celsius, depending on the type and amount of $MF_2$ to be used, for about four hours in a forming gas of nitrogen with about five percent hydrogen ($N_2$+5% $H_2$) flow, and $Eu^{3+}$ will then be reduced to $Eu^{2+}$. For example, for a batch where M=Sr and x=0.04, the chemical weights were as follows: 3.580 gm $SrCO_3$, 0.063 gm $SrF_2$, 0.504 gm MgO, 1.502 gm $SiO_2$, 0.044 gm $Eu_2O_3$, 0.093 gm $Dy_2O_3$, and 0.0309 gm $H_3BO_3$.

The X-ray diffraction patterns of $Sr_{1.94}Eu_{0.02}Dy_{0.04}MgSi_2O_7$, $Sr_{1.94}Eu_{0.02}Dy_{0.04}MgSi_2O_{6.36}F_{1.28}$ and $Sr_{1.30}Ca_{0.64}Eu_{0.02}Dy_{0.04}MgSi_2O_{6.36}F_{1.28}$ are shown in FIG. 1. The X-ray patterns of $Sr_{1.94}Eu_{0.02}Dy_{0.04}MgSi_2O_7$, $Sr_{1.78}Ba_{0.16}Eu_{0.02}Dy_{0.04}MgSi_2O_{6.84}F_{0.32}$ and $Sr_{1.30}Ba_{0.64}Eu_{0.02}Dy_{0.04}MgSi_2O_{6.36}F_{1.28}$ are shown in FIG. 2. It can be seen that the crystal structure of phosphors incorporating the $MF_2$ has not changed notably. It is believed that fluorine ions enter into the lattice of $Sr_2MgSi_2O_7$. It can also be seen that no extra phase of $MF_2$ (the X-ray peak positions marked with vertical arrows) was detected.

Figure 3:
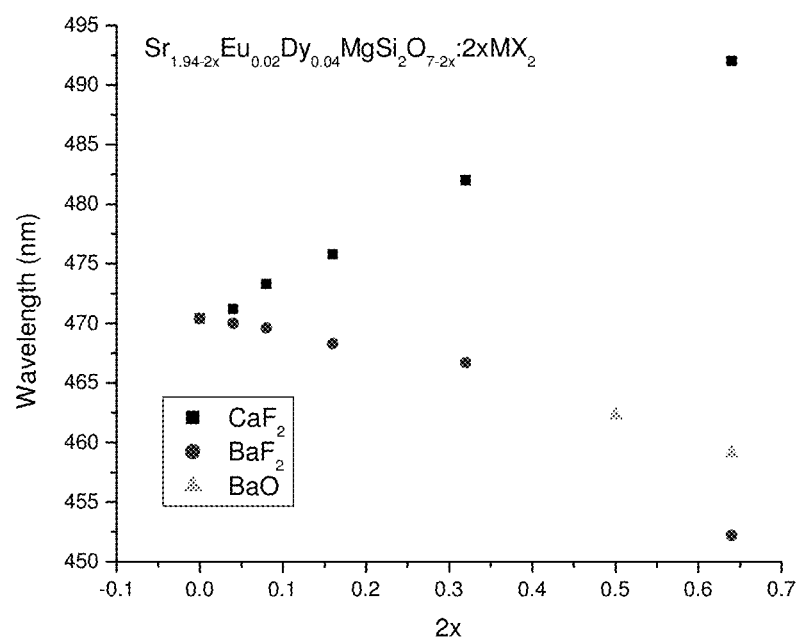
FIG. 3 is a graph showing wavelength dependence of emission on the concentration of fluorides $BaF_2$ and $CaF_2$.

In addition, with the incorporation of fluoride, the emission wavelength (emission colors) was tuned to provide desired output wavelengths. In the case of $CaF_2$ addition, the emission wavelength became longer (exhibiting a shift to wavelengths associated with the color green), while addition of $BaF_2$ provided for shifting the emission wavelength to the blue side, as shown in FIG. 3. Incorporating $SrF_2$ or $MgF_2$, no obvious change in emission wavelength was observed.

Figure 4:
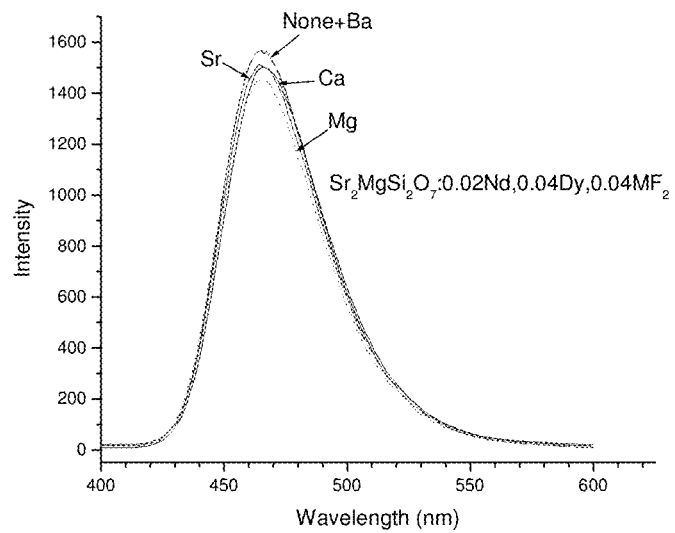
FIG. 4 is a graph showing emission spectra of $Sr_2MgSi_2O_7$:$Eu^{2+}$,Dy: $0.04MF_2$ with M=Sr, Ba, Ca, Mg.

FIG. 4 shows the emission spectra of $Sr_2MgSi_2O_7$:Eu,Dy, 0.04$MF_2$ with M=None, Sr, Ba, Ca, and Mg. At this doping level, emission intensity is almost the same as exhibited in FIG. 3.

Example 2

In a second example, phosphors with incorporation of chlorides, 0.04$MCl_2$ (M=Sr, Ca, Ba) were produced:

1.90 $SrCO_3$+0.04$MCl_2$+MgO+$2SiO_2$+0.01$Eu_2O_3$+ 0.02$Dy_2O_3$+0.04$H_3BO_3$

For embodiments where M=Mg, the following recipe was used:

1.94 $SrCO_3$+0.96MgO+0.04$MCl_2$+$2SiO_2$+ 0.01$Eu_2O_3$+0.02$Dy_2O_3$+0.04$H_3BO_3$

Figure 5:
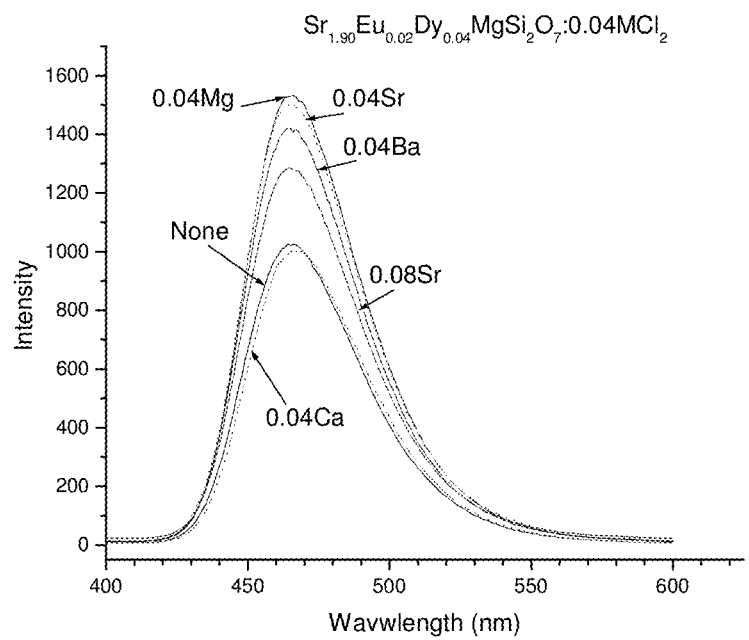
FIG. 5 is a graph showing emission spectra of $Sr_2MgSi_2O_7$:Eu,Dy: $0.04MCl_2$ with M=Sr, Ca, Ba and Mg.
Figure 6:
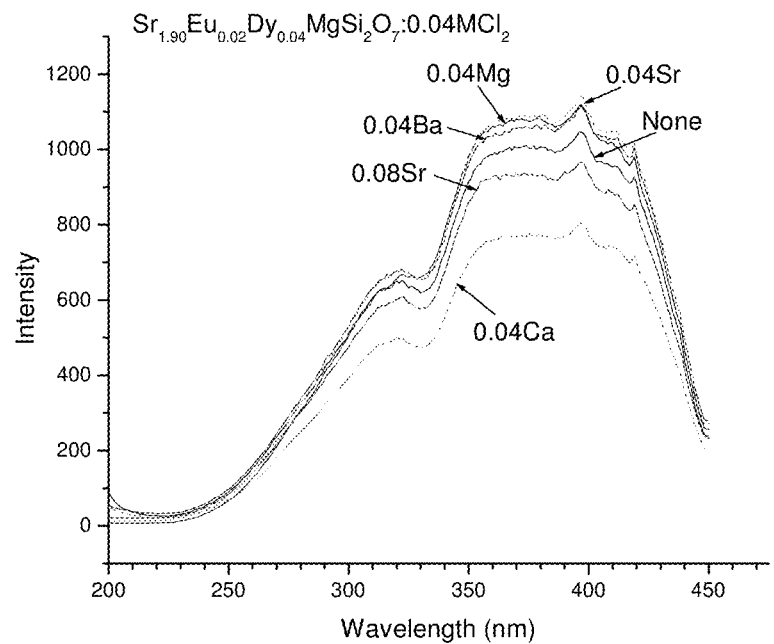
FIG. 6 is a graph showing excitation spectra of $Sr_2MgSi_2O_7$:Eu,Dy: $0.04MCl_2$ with M=Sr, Ca, Ba, and Mg.

Chlorides of alkaline earths have much lower melting temperatures than their oxides. Therefore, they can be used to promote "self-fluxing" thus resulting in improved chemical reactions and crystallinity. For the case where M=Sr, the ingredients used were as follows: 3.5061 gm $SrCO_3$, 0.1332 gm $SrCl_2$·$6H_2O$, 0.5037 gm MgO, 1.5021 gm $SiO_2$, 0.0440 gm $Eu_2O_3$, 0.0932 gm $Dy_2O_3$ and 0.0309 gm $H_3BO_3$. The chemicals were mixed, ground, pre-sintered at about 900 degrees Celsius for about four hours and ground again. This mixture was finally sintered at about 1,200 degrees Celsius for about four hours in a slightly reducing flow of hydrogenated nitrogen gas ($N_2$+5% $H_2$). The emission and excitation spectra are shown in FIGS. 5 and 6, respectively. It can be seen that the emission intensity is obviously improved.

Figure 7:
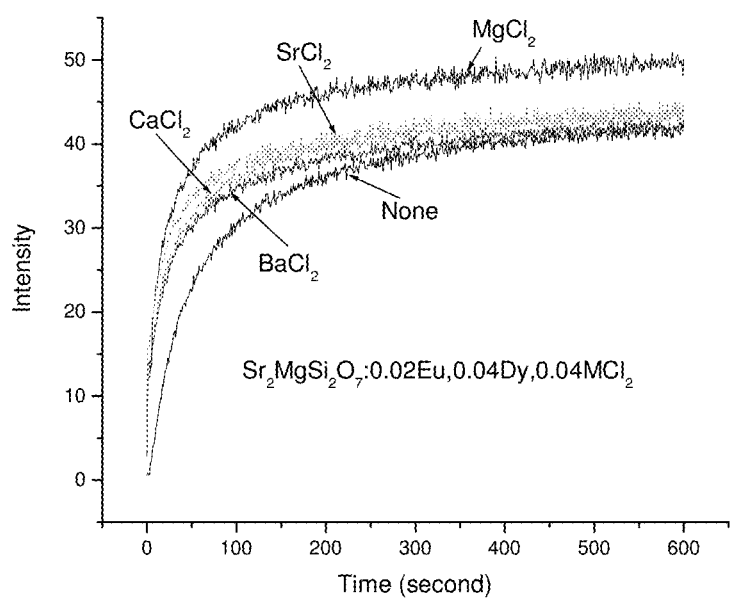
FIG. 7 is a graph showing charging rate of $Sr_2MgSi_2O_7$:Eu,Dy: $0.04MCl_2$ with M=Sr, Ca, Ba, and Mg.

Based on the improvement of crystallinity, an increase of charging rate of the phosphors may be predicted. FIG. 7 shows the charging curves of these samples. In the experiment, the samples were completely discharged overnight in the dark. The samples were then charged. The pump source was output from a Xenon lamp with output at 365 nm with the exit slit=1 nm according to a F-7000 Hitachi spectrophotometer. It can be seen that, in the first minutes, the charging rate was two or three times faster than the sample without chlorides doped.

Example 3

In a third example, deep blue phosphors were fabricated. In practical applications, some deep blue phosphors emitting at 460 nm are required. For this purpose, the following recipes were tested.

a. 1.40$SrCO_3$+0.54$BaF_2$+MgO+$2SiO_2$+0.01$Eu_2O_3$+ 0.02$Dy_2O_3$+0.04$H_3BO_3$, b. 1.40$SrCO_3$+MgO+0.50$BaCO_3$+0.04$BaF_2$+$2SiO_2$+ 0.01$Eu_2O_3$+0.02$Dy_2O_3$+0.04$H_3BO_3$.

The ingredients for the first recipe were: 2.5836 gm $SrCO_3$, 1.1836 gm $BaF_2$, 0.5037 gm MgO, 1.5021 gm $SiO_2$, 0.044 gm $Eu_2O_3$, 0.0932 gm $Dy_2O_3$, although it is considered that the boric acid was not actually necessary. For the second recipe, the amount of $BaF_2$ is replaced by 1.2333 gm $BaCO_3$ plus 0.0879 gm $BaF_2$. The preparation procedures are similar as in the case of example 1, except the first recipe for which the pre-sintering temperature is around 800 degrees Celsius and final sintering temperature is about 900 degrees Celsius.

Figure 8:
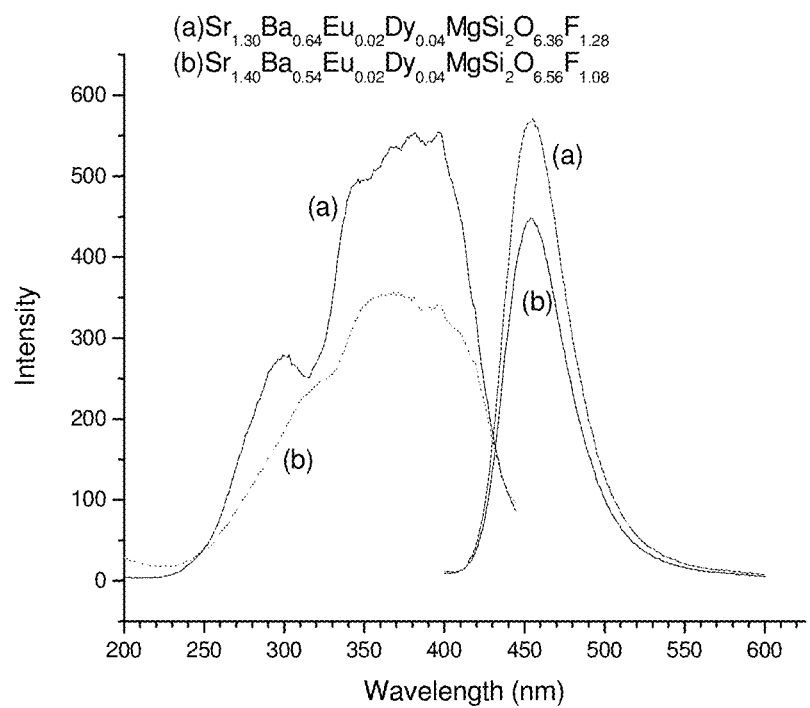
FIG. 8 is a graph showing emission and excitation of deep blue phosphors $Sr_{1.40}Ba_{0.54}MgSi_2O_{6.56}F_{1.08}$:0.02Eu,0.04Dy and $Sr_{1.40}Ba_{0.54}MgSi_2O_{6.96}F_{0.08}$:0.02Eu,$Dy_{0.04}$.

The emission and excitation spectra are shown in FIG. 8. The emission band for both samples is peaked at about 460 nm. It is interesting to note for the silicate and silicate-halide phosphors, the Stokes shift is quite small. As a result, for the deep blue phosphors, the absorption in the violet range (of about 400 nm to about 450 nm) is very strong. This is a great advantage for efficient photo-charging in ambient light.

Example 4

In a fourth example, glassy phosphors (i.e., vitreous phosphors) were produced. As mentioned before, phosphors with fluorides incorporated have lower melting temperatures. Therefore, it is possible to make glassy phosphors at rela tively low temperatures. The following phosphors can be synthesized at generally lower temperatures:

(a) $Sr_2MgSi_2O_7$:Eu,Dy:(0.05-1.0) $BaF_2$, sintering temperature can be between about 900 degrees Celsius to about 1,300 degrees Celsius.

(b) $Sr_2MgSi_2O_7$:Eu,Dy:(0.2-0.8)$MgF_2$. Sintering temperature can be between about 850 degrees Celsius to about 1,250 degrees Celsius.

(c) $SrMgSi_2O_6$:Eu,Dy:(0.0-0.50) $BaF_2$, sintering temperature can be between about 850 degrees Celsius to about 1,200 degrees Celsius. It is noted that $SrMgSi_2O_6$ is close to the ternary eutectic point at temperatures of about 1,150 degrees Celsius.

The emission color of phosphor (b) does not change substantially in comparison to the appearance color, while the emission color of phosphors (a) and (c) will change afterglow color with $BaF_2$. Glassy temperatures should be about 50 degrees Celsius to about 100 degrees Celsius higher than the sintering temperature. In sample (c), using about 0.54BaF, a glassy phosphor may be formed at around 950 degrees Celsius.

Example 5

In a fifth example, phosphors were co-doped with 3d ions, and used the synthesis procedure of Example (1). The following recipe was used:

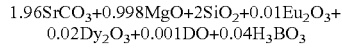
$0.02Dy_2O_3 + 0.001DO + 0.04H_3BO_3$ where D=one of Co, Fe, Cr, Mn, Cu, or Ni.

Figure 9:
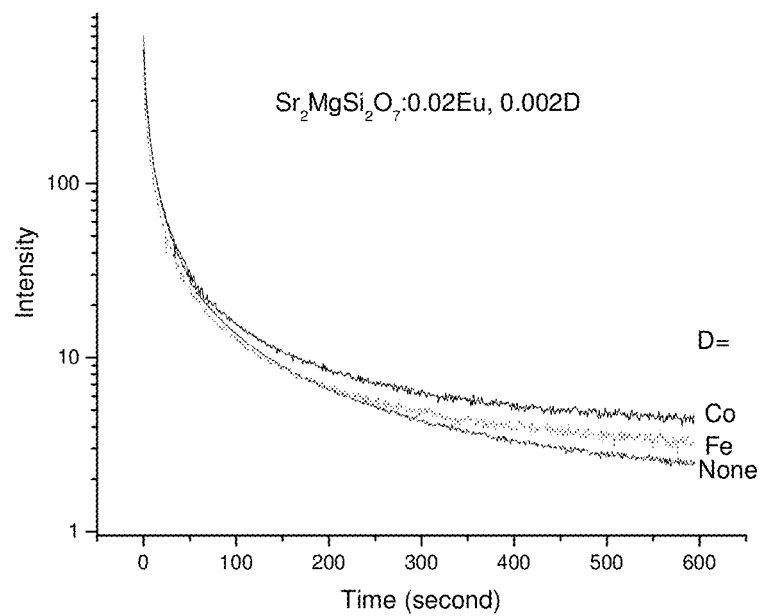
FIG. 9 is a graph showing decay curves of $Sr_2MgSi_2O_7$:Eu,Dy: 0.002D (D=None, Co and Fe)

It was noted that when the doping level is low (<0.002), some 3d ions provide trapping centers, and improve afterglow. FIG. 9 shows the afterglow decay curves of phosphors $Sr_2MgSi_2O_7$:0.02Eu, using 0.002D (D=Co and Fe). In order to test the role of the 3d ions, rare earth element Dy was not doped into the samples, although in practice, Dy may be included.

Figure 10:
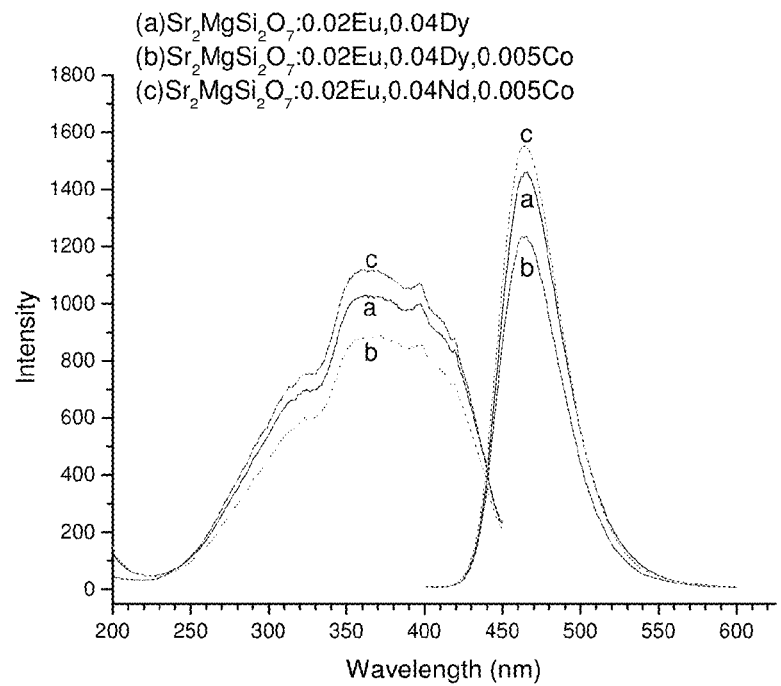
FIG. 10 is a graph showing emission and excitation spectra of $Sr_2MgSi_2O_7$:0.02Eu co-doped with (a) 0.04Dy, (b) 0.04Dy and 0.005Co, and (c) 0.04Nd and 0.005Co, where the body colors (b) and (c) are blue.

It was noted that when the doping level of 3d ions is higher, the afterglow is quenched a little, but the phosphor will show some specific body color in room light. For example, adding Co (0.005 mol.) the phosphor showed a blue body color. In addition, some rare earth ions, such as Nd or Pr at a little higher doping level, will give a blue or green body color respectively. FIG. 10 shows the emission and excitation spectra of phosphors $Sr_2MgSi_2O_7$:0.02Eu co-doped with (a) 0.04Dy, (b) 0.04Dy and 0.005Co, and (c) 0.04Nd and 0.005Co. The body colors (b) and (c) are blue.

Figure 11:
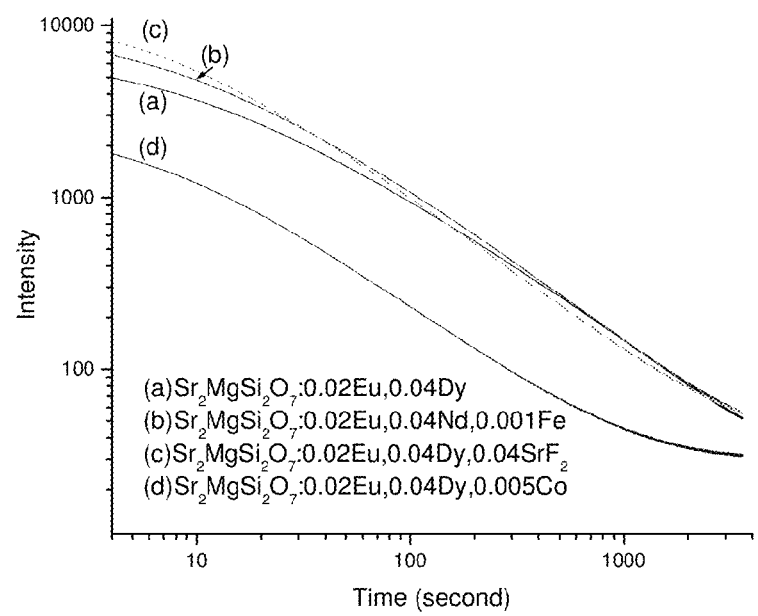
FIG. 11 is a graph showing decay curves of phosphors $Sr_2MgSi_2O_7$:0.02Eu co-doped with (a) 0.04Dy, (b) 0.04Nd, 0.001Fe, (c) 0.04Dy,$0.04SrF_2$, and (d) 0.04Dy,0.005Co.

FIG. 11 shows the decay curves for some phosphors discussed herein. In this illustration, intensity of emissions is shown for $Sr_2MgSi_2O_7$:0.02Eu co-doped with (a) 0.04Dy, (b) 0.04Nd, 0.001Fe, (c) 0.04Dy, 0.04$SrF_2$, and (d) 0.04Dy, 0.005Co.

Having thus described aspects of the invention, one skilled in the art will recognize that a variety of compositions and arrangements of compositions may be useful for practice of the teachings herein. Accordingly, the compositions and arrangements of compositions disclosed herein are merely illustrative of embodiments, and are not limiting of the invention disclosed herein.

Therefore, while the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A phosphorescent silicate-halide composition, according to the general formula:

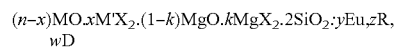

where
M is at least one of Sr, Ca, and Ba;
M' is at least one of Sr, Ca and Ba;
X is at least one of F and Cl;
R is at least one of $Dy^{3+}$ and $Nd^{3+}$, and optionally comprises at least one rare earth selected from the group of ions comprising La, Ce, Pr, Sm, Gd, Tb, Ho, Er, Tm, Yb, Y and Lu;
D is at least one 3d ion selected from the group consisting of Ti, V, Cr, Mn, Fe, Co, Ni and Cu;
n ranges from 0.9 to 3.2;
x ranges from 0.0001 to 0.7;
k ranges from 0.0001 to 1.0;
y ranges from 0.0001 to 0.1;
z ranges from 0.0001 to 0.1; and
w ranges from 0.0001 to 0.02.

2. A phosphorescent silicate-halide composition, according to the general formula:

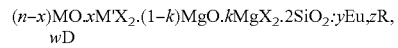

where
n=2, M=Sr,
M'=Ba,
X=F and Cl,
R=$Dy^{3+}$, $Nd^{3+}$, $Er^{3+}$, $Tm^{3+}$, $Ho^{3+}$, or a combination thereof,
D is at least one 3d ion selected from the group consisting of Ti, V, Cr, Mn, Fe, Co, Ni and Cu,
x=0.0001 to 0.7,
k=0,
y=0.0001 to 0.1,
z=0.0001 to 0.1, and
w=0.001 to 0.02.

3. The composition of claim 1, where: n=1, M=Sr, M'=at least one of Sr, Ca, and Ba, X=F or Cl, x=0.0001 to 0.7, y=0.0001 to 01, z=0.0001 to 0.1, R=at least one of $Dy^{3+}$ and $Nd^{3+}$ and optionally further comprises one or more other rare earth materials, and w=0.001 to 0.2.

4. The composition of claim 1, wherein an emission wavelength of the composition is centered about a wavelength that is within range of about 455 nm to about 490 nm.

5. The composition of claim 1, wherein an absorption wavelength of the composition is centered about a wavelength that is within a range of about 400 nm to about 450 nm.

6. A method for fabricating a glassy phosphorescent silicate-halide composition, the method comprising:
mixing a composition according to the general formula:

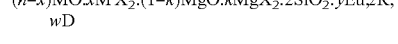

where
M is at least on of Sr, Ca, and Ba;
M' is at least one of Sr, Ca and Ba;
X is at least one of F and Cl;

R is at least one of $Dy^{3+}$ and $Nd^{3+}$, and optionally comprises at least one rare earth selected from the group of ions comprising La, Ce, Pr, Sm, Gd, Tb, Ho, Er, Tm, Y, Yb, and Lu;

D is at least one 3d ion selected from the group consisting of Ti, V, Cr, Mn, Fe, Co, Ni and Cu;

n ranges from 0.9 to 3.2;

x ranges from 0.0001 to 0.7;

k ranges from 0.0001 to 1.0;

y ranges from 0.0001 to 0.1;

z ranges from 0.0001 to 0.1;

w ranges from 0.0001 to 0.02;

sintering the mixture at a temperature from about 850 degrees Celsius to about 1,400 degrees Celsius; and finishing the composition at a temperature that is elevated about 50 degrees Celsius to about 100 degrees Celsius above the sintering temperature.

7. The method as in claim 6, wherein the sintering temperature is between about 850 degrees Celsius and 1,300 degrees Celsius.

* * * * *